May 26, 1925.
S. I. PRESCOTT
MOTOR CAR SPRING SUSPENSION
Filed Oct. 7, 1921
1,539,272
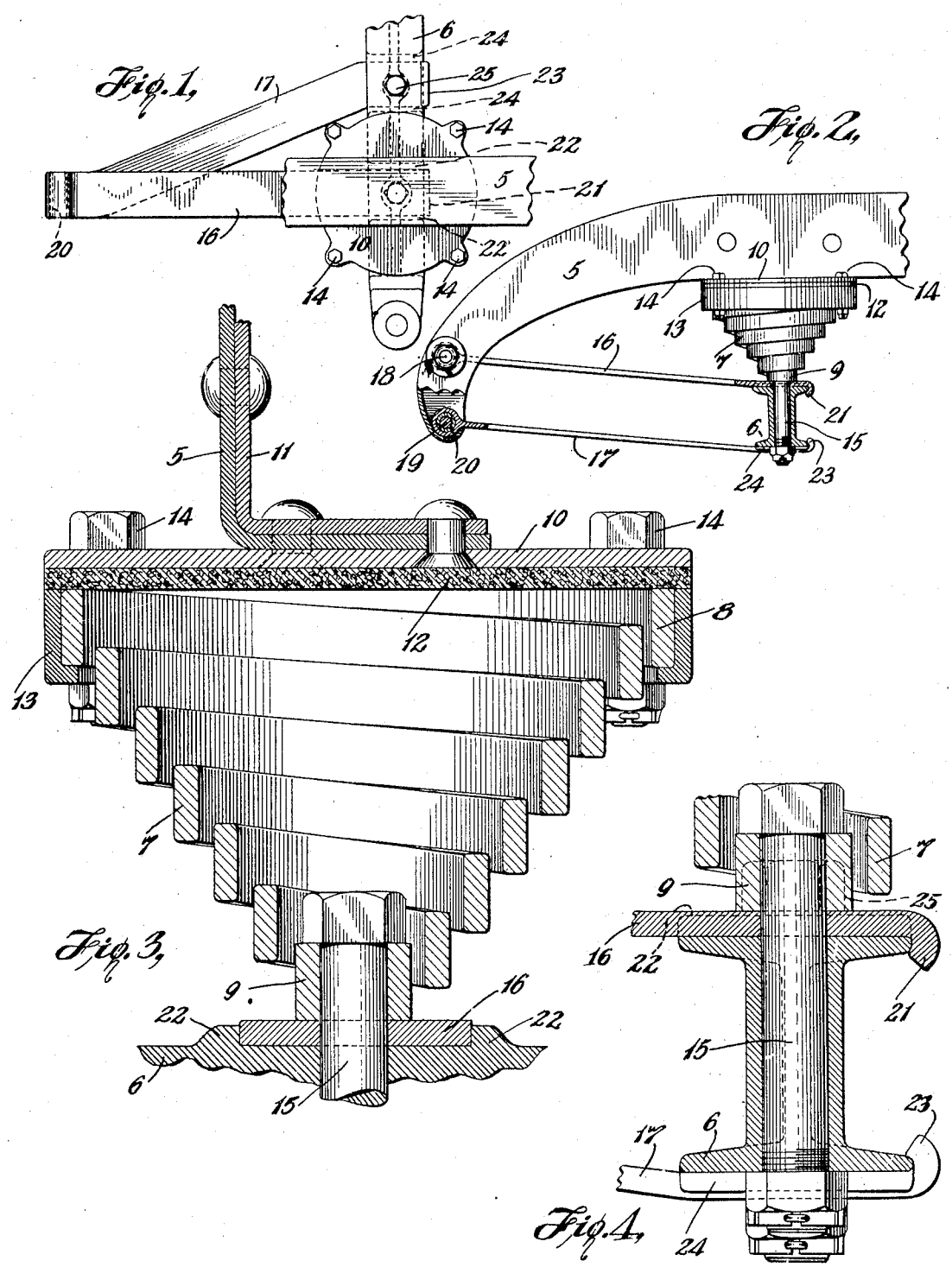

Patented May 26, 1925.

1,539,272

UNITED STATES PATENT OFFICE.

SYDNEY I. PRESCOTT, OF NEW YORK, N. Y.

MOTOR-CAR SPRING SUSPENSION.

Application filed October 7, 1921. Serial No. 505,993.

*To all whom it may concern:*

Be it known that I, SYDNEY I. PRESCOTT, a citizen of the United States, residing at New York, county of New York, and State of New York, have invented a new and useful Improvement in Motor-Car Spring Suspensions, of which the following is a specification.

This invention relates to an improvement in motor car spring suspensions, and it has for its main object the production of a spring suspension, particularly for this type of vehicle, free from the inherent defects of springs of the multiple leaf type that have heretofore come into universal use, free from the difficulties encountered in their use, and improving the essential riding qualities of the motor car. Another object is the production of a single leaf spring having an effective length which progressively ranges from maximum effective length under no deflection to no effective length under maximum deflection, and means coacting therewith to progressively decrease the effective length of the spring in accordance with any amplitude of deflection to which it is subject, thus providing a frictionless spring perfectly responsive to deflection shock in any degree and having no definite critical period of vibration and violent rebound,—a result unattainable by multiple leaf or other fixed length springs. Another object is the production of a spring suspension including a spring of the single leaf type just described and a mount therefor which relieves the spring of all stress excepting that caused by its own deflection, thus insuring perfectly free spring action,—a result unattainable by multiple leaf springs wherein their action is subject to interference by the counter stresses set up by axle trailing, side sway, driving torque, braking torque, or insufficient lubrication; or all of them. Another object is the production of a spring suspension which is not only more efficient but more economical, free from wear, free from noise, free from the stiffening effect of rust, and withal stronger though more sensitive. With these and other objects not specifically mentioned in view, the invention consists in certain constructions and combinations which will be hereinafter fully described and then specifically pointed out in the claims hereunto appended.

In the accompanying drawings, which form a part of this specification and in which like characters of reference indicate the same or like parts, Fig. 1 is a plan view, partly broken away, of a device constructed in accordance with the invention; Fig. 2 is a side elevation, partly in section, of the structure shown in Fig. 1; Fig. 3 is a cross sectional view, on an enlarged scale, of the spring and a part of its mount shown in Figs. 1 and 2; and Fig. 4 is a fragmentary fore and aft sectional view showing certain details of the spring mount.

In carrying the invention into effect, there is provided a very long single leaf spring coiled in volute form and having an effective length (length subject to deflection) which progressively ranges from maximum length under no deflection (but under full load) to no effective length under maximum deflection (when the spring becomes solid), means coacting with said spring to progressively decrease its effective length in accordance with any amplitude of deflection, or, in other words, in accordance with any degree of shock to which the spring is subjected, and a mount which relieves the spring of all stress excepting that caused by its deflection, to insure perfectly free spring action and perfectly efficient cushioning effect. In the best constructions, there is further provided a noiseless buffer interposed between the spring and its coacting means, to silently shorten the spring under deflection; means for anchoring the base coil of the spring to its coacting means; and means for anchoring the apex coil of the spring to an axle. In the best constructions also, the mount includes connections between an axle and frame in the form of a radius member adapted to relieve the spring of all stress foreign to its cushioning function. All the above mentioned means and parts may be widely varied in construction within the scope of the claims, for the particular structure selected to illustrate the invention is but one of many possible concrete embodiments of the same. The invention, therefore, is not to be restricted to the precise details of the structure shown and described.

Referring to the drawings, 5 indicates a side member of a motor car frame, and 6 indicates a front or steering axle used in connection with the same. Intervening between the frame and axle is a volute spring 7 formed of a bar of spring steel of substantially uniform cross section throughout its length, the area of the cross section being determined by the load to be carried. The base coil 8 of this spring is its uppermost coil, as shown in the drawings, and its apex coil 9 is its lowermost coil. The spring, however, may be reversed in certain installations. The spring 7 has an effective length, exclusive of its base coil 8 and its apex coil 9, which progressively ranges from maximum effective length under no deflection, as shown, to no effective length under maximum deflection.

There is further provided means coacting with the volute spring 7 to progressively decrease its effective length in accordance with any amplitude of deflection. As shown, this means consists in a discal abutment 10 which is riveted to the frame 5 and to a frame reinforcing member 11 in the wake of the abutment, as clearly shown in Fig. 3. For the purpose of eliminating noise during spring action, there is provided a noiseless buffer interposed between the base coil 8 of the spring and the abutment 10. As shown, this buffer consists of a discal pad 12 of leather or other fibrous material suitable for the purpose. The buffer 12 is held against the abutment 10, and the base coil 8 of the spring is held against the buffer 12 by means of a shouldered ring 13 secured to the abutment 10 by means of four through bolts 14. The apex coil 9 of the spring is connected with the axle 6 by means of a through bolt 15 carried by the axle.

For the purpose of relieving the spring of all stress, except that caused by its deflection, so that its action will be unaffected by any stresses foreign to its function, there is provided a mount for the spring including connections between the axle and frame in the form of a radius member which, as shown, comprises two bars 16 and 17, the bar 16 being pivoted to the frame at 18, and the bar 17 being pivoted to the frame at 19 below the pivotal point 18. Each of the bars 16 and 17, where pivoted to the frame, is provided with a self-lubricating bush 20 of well known type. The bar 16 is hooked over the upper edge of the axle 6 at 21, rests upon the top of said axle between transverse ridges 22 forged on the axle, and is held in position by means of the spring bolt 15 before referred to. The bar 17 is hooked over the lower edge of the axle 6 at 23, rests against the bottom of said axle between transverse ridges 24 forged on the axle, and is held in place by means of a bolt 25 carried by the axle and similar to the spring bolt 15 before referred to. By an inspection of Fig. 1, it will be readily understood that one of the bars is substantially straight while the other is laterally offset, and that although both bars are pivotally connected to the frame in the same vertical plane, they are connected to the axle one above and offset from the other. Both bars are constructed of spring steel and are flat and laterally rigid, but longitudinally flexible and transversely twistable. As a result of the construction just described, the action of the spring 7 under deflection is in no way interfered with by the pull of the radius member in trailing the axle or by side sway, the latter being effectually prevented by the lateral rigidity of the radius member. When one wheel rises over a road obstruction, the angle of the axle with respect to the surface of the ground is somewhat changed, but this is taken care of by the torsibility of the radius member; and although the axis of the bolt 15 will be thrown slightly out of vertical position, the change is insufficient to have any effect upon the action of the spring. In very light motor cars, sufficient lateral rigidity of the radius member may be obtained by making both the bars 16 and 17 straight and bolting them to the axle 6 by means of the spring bolt 15, the axle ridges 24 in such case being immediately below the axle ridges 22.

It is to be understood that the spring and its mount used at the other end of the axle 6 is like that shown excepting that the corresponding bar 17 is offset in the other direction. It is to be understood also that the device can be used in connection with a rear axle by a simple and obvious change in the form of the radius member axle seat. When so used, however, the driving and braking torque should be provided for by a torque rod independent of the spring suspension.

When a wheel strikes a road obstruction and is thrown upward thereby, spring deflection begins. The upper effective coil of the spring 7, being the longest, yields first, and its upper edge progressively engages the buffer 12, thereby shortening its effective length in accordance with the particular amplitude of deflection involved. If the obstruction is a small one, the deflection of the lower effective coil or coils of the spring will be infinitesimal, and the entire shock will be practically absorbed by the upper effective coil or coils.

If the obstruction met by the wheel is an extremely large one and the speed of the car is great, the force of the up-kick may be sufficient to deflect the spring until the head of the bolt 15 itself engages the buffer 12. In this event, a rare one, the spring will have no effective length left, but will have reached this condition by a progressive absorption of the shock due to the shortening of the spring as it progressively comes in contact with the buffer 12 during deflection. During deflection, the stress developed increases at a higher rate than deflection amplitude, because the spring is shortened and its lower coils are inherently stiffer than its upper ones. The action of the spring may be represented by a curve which is initially horizontal but ultimately vertical, and such a curve is the curve which represents ideal spring action.

Between the above two extremes of deflection, an infinite number of degrees of deflection and degrees of spring shortening may occur, and, whatever the degree of deflection may be, the spring has no definite critical period of vibration because, in action, under deflection and during rebound, its effective length is constantly changing and the energy progressively absorbed by the spring during deflection is inversely and progressively dissipated during rebound.

No part of the spring is in contact with any other part during deflection or rebound, and consequently no frictional resistance is set up, and no lubrication is required. Moreover, if, through neglect, the spring becomes rusty, the rust cannot affect its resiliency; and the parallel radius members effectually prevent the spring from interfering with the action of steering or driving mechanisms.

What is claimed is:

1. In a motor car spring suspension, the combination with an axle, of a frame, an intervening load-carrying volute spring, and connections between said axle and said frame which include two slightly flexible bars pivotally connected with said frame one above the other and rigidly bolted one to the top and one to the bottom of said axle to relieve said spring of all stress excepting that caused by its deflection.

2. In a motor car spring suspension, the combination with an axle, of a frame, an intervening load-carrying volute spring, an abutment coacting with said spring to control its effective length, means for anchoring the base coil of said spring to said abutment, a bolt for anchoring the apex coil of said spring to said axle, and connections between said axle and said frame which include two slightly flexible bars pivotally connected with said frame one above the other and rigidly bolted one to the top and one to the bottom of said axle to relieve said spring of all stress excepting that caused by its deflection.

3. In a motor car spring suspension, the combination with an axle, of a frame, an intervening load-carrying volute spring, an abutment carried by said frame and coacting with said spring to control its effective length, a shouldered ring bolted to said abutment for anchoring the base coil of said spring to said abutment, a bolt carried by said axle for anchoring the apex coil of said spring to said axle, and connections between said axle and said frame which include two slightly flexible bars pivotally connected with said frame one above the other and rigidly bolted one to the top and one to the bottom of said axle to relieve said spring of all stress excepting that caused by its deflection.

4. In a motor car spring suspension, the combination with an axle, of a frame, an intervening load-carrying volute spring, an abutment coacting with said spring to control its effective length, a sound-deadening buffer interposed between said spring and said abutment, a shouldered ring bolted to said abutment for anchoring the base coil of said spring to said abutment, a bolt for anchoring the apex coil of said spring to said axle, and connections between said axle and said frame which include two slightly flexible bars pivotally connected with said frame one above the other and rigidly bolted one to the top and one to the bottom of said axle to relieve said spring of all stress excepting that caused by its deflection.

5. In a motor car spring suspension, the combination with an axle, of a frame, an intervening volute spring, an abutment coacting with said spring to control its effective length, means for anchoring the base coil of said spring to said abutment, means for anchoring the apex coil of said spring to said axle, and a radius member comprising two bars pivotally connected with said frame one over the other and bolted to said axle one above but offset from the other.

6. In a motor car spring suspension, the combination with an axle, of a frame, an intervening volute spring, an abutment carried by said frame and coacting with said spring to control its effective length, means for anchoring the base coil of said spring to said axle, and a radius member comprising two bars pivotally connected with said frame one over the other, the upper bar being connected with the top of said axle at the apex coil anchorage and the lower bar being connected with the bottom of said axle at a point laterally offset from said apex coil anchorage.

7. In an motor car spring suspension, the combination with an axle, of a frame, an intervening volute spring, an abutment carried by said frame and coacting with said spring to control its effective length, a noiseless buffer interposed between said spring and said abutment, a ring bolted to said abutment and holding said buffer against said abutment and also holding the base coil of said spring against said buffer, a bolt carried by said axle and holding the apex coil of said spring in connection with said axle, and a radius member comprising two bars pivotally connected with said frame one over the other, the upper bar being connected with the top of said axle by said spring bolt and the lower bar being bolted to the bottom of said axle at a point laterally offset from said spring bolt.

8. In a motor car spring suspension, the combination with an axle, of a frame, an intervening spring, and a radius member comprising two bars pivotally connected with said frame one over the other, the upper bar being connected with the top of said axle and the lower bar being connected with the bottom of said axle at a point laterally offset from the upper bar connection, said bars being flat and laterally rigid but longitudinally flexible and transversely twistable.

In testimony whereof, I have signed my name to this specification.

SYDNEY I. PRESCOTT.